United States Patent
Wang et al.

(10) Patent No.: US 12,249,108 B2
(45) Date of Patent: Mar. 11, 2025

(54) 3D IMAGE SENSING DEVICE WITH 3D IMAGE PROCESSING FUNCTION AND 3D IMAGE PROCESSING METHOD APPLIED THERETO

(71) Applicant: PRIMAX ELECTRONICS LTD., Taipei (TW)

(72) Inventors: Hsiu-Wen Wang, Taipei (TW); Chih-Wen Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 250 days.

(21) Appl. No.: 18/155,086

(22) Filed: Jan. 17, 2023

(65) Prior Publication Data
US 2024/0144575 A1    May 2, 2024

(30) Foreign Application Priority Data
Oct. 31, 2022   (TW) .................................. 111141324

(51) Int. Cl.
| | |
|---|---|
| *G06V 10/141* | (2022.01) |
| *G06T 7/13* | (2017.01) |
| *G06T 7/50* | (2017.01) |
| *G06T 17/00* | (2006.01) |
| *H04N 13/106* | (2018.01) |

(52) U.S. Cl.
CPC .............. *G06V 10/141* (2022.01); *G06T 7/13* (2017.01); *G06T 7/50* (2017.01); *G06T 17/00* (2013.01); *H04N 13/106* (2018.05); *G06T 2207/10028* (2013.01); *G06T 2207/10152* (2013.01)

(58) Field of Classification Search
CPC .......... G06T 17/00; G06T 7/593; G06T 7/596
See application file for complete search history.

(56) References Cited

U.S. PATENT DOCUMENTS

| | | | |
|---|---|---|---|
| 2018/0139431 A1* | 5/2018 | Simek | H04N 13/271 |
| 2019/0068853 A1* | 2/2019 | Price | H04N 5/33 |
| 2021/0065392 A1* | 3/2021 | Bleyer | H04N 13/254 |

* cited by examiner

*Primary Examiner* — Ryan McCulley
(74) *Attorney, Agent, or Firm* — WPAT, PC (57) ABSTRACT

A 3D image sensing device includes a first camera lens, a second camera lens and a light source. A 3D image processing method for the 3D image sensing device includes the following steps. Firstly, a target is photographed by the first camera lens and the second camera lens, and the obtained images are processed in a stereo vision mode. Consequently, a first depth map is obtained. After the light source emits plural feature points to the target, the target is photographed by the first camera lens and the second camera lens, and the obtained images are processed in an active stereo vision mode. Consequently, a second depth map is obtained. The first depth map and the second depth map are synthesized as a synthesized depth map according to a synthetization strategy.

12 Claims, 5 Drawing Sheets

3D IMAGE SENSING DEVICE WITH 3D IMAGE PROCESSING FUNCTION AND 3D IMAGE PROCESSING METHOD APPLIED THERETO

FIELD OF THE INVENTION

The present invention relates to a 3D image sensing device with a 3D image processing function and a 3D image processing method for the 3D image sensing device, and more particularly to a 3D image sensing device and a 3D image processing method for synthesizing depth maps according to a stereo vision technology and an active stereo vision technology.

BACKGROUND OF THE INVENTION

With the gradual development of the 3D (stereo) image sensing technology, many mobile electronic devices such as digital cameras, tablet computers, smart phones, smart watches or wearable electronic devices are gradually equipped with 3D image sensing modules as their camera lenses.

Nowadays, the 3D image sensing technologies mainly include a stereo vision technology, a structured light technology, a time of flight (TOF) technology, and the like.

For example, in accordance with the operating principles of the stereo vision technology, two lenses are used to simulate human eyes and photograph the same target from different viewing angles to acquire a left image and a right image. After the left image and the right image are subjected to calculation according to a matching algorithm, a parallax image is generated. Then, a depth map corresponding to the parallax image is calculated according to trigonometric functions. In other words, the information about the distance between the electronic device and the target is obtained according to the depth map.

In the image processing process, the high feature parts (e.g., the edge parts or the patterns contained in the object) are taken for calculation. If more feature parts are contained, more information can be obtained. However, if the target has a small number of feature parts (e.g., a flat or curved surface with simple composition or monochromatic system), the depth map of the parallax image that is photographed and calculated according to the stereo vision technology has vacant sites. That is, some necessary depth data are not provided. Consequently, the information about the distance information between the electronic device and the target is insufficient.

For overcoming the above drawbacks, an active stereo vision technology is developed from the stereo vision technology. In accordance with the active stereo vision technology, a light source is used to emit plural feature points onto the target, the target is photographed by the two lenses, and the acquired image is subjected to calculation. For example, the light source is a light-emitting diode (LED), a laser diode (LD) or a vertical cavity surface emitting laser (VCSEL) that can emit infrared light beams or near-infrared light beams.

The feature points indicates the visible light spots or the invisible light spots that can be seen by the camera lens. In addition, the feature points have the features of uniform dispersion. Consequently, the depth map can be obtained by identifying all feature points on the target. If the features of the target are insufficient, this method is still able to effectively obtain the information about the distance between the electronic device and the target. In other words, the use of the active stereo vision technology can make up for the shortcomings of the stereo vision technology that cannot successfully identify some features.

However, if the target is presented as a wire, some other drawbacks occur. For example, since the area of the wire is relatively small, it is difficult for the wire to receive a sufficient number of feature points from the light source. In other words, the use of the active stereo vision technology is unable to effectively identify this kind of target. Whereas, if this kind of target is photographed and calculated according to the stereo vision technology, the target can be successfully identified. On the other hand, if the target contain so many features (e.g., the composition of the target is diverse or the color is rich), the identification efficacy of the active stereo vision technology is still unsatisfied. In other words, the applications of the active stereo vision technology and the stereo vision technology have their own advantages and disadvantages.

Nowadays, the 3D image sensing technologies have been widely applied to various electronic devices (e.g., smart cars, robots, or wearable devices) for providing environmental sensing functions, face recognition functions, gesture recognition functions or any other appropriate functions. The target using the 3D image sensing technology may be any kind of object, and the target may have many or few features. For achieving better identification results and overcoming the vacant site problem in the depth map, it is necessary to properly use the active stereo vision technology and the stereo vision technology in different situations.

SUMMARY OF THE INVENTION

An object of the present invention provides a 3D image sensing device with a 3D image processing function and a 3D image processing method for the 3D image sensing device. In accordance with the 3D image sensing device and the 3D image processing method, the stereo vision technology and the active stereo vision technology are used to photograph the target, check the depth data, select the depth maps, calculate the depth data and synthesize the depth maps. Consequently, the vacant sites in the synthesized depth map are largely reduced.

In accordance with an aspect of the present invention, a 3D image processing method for a 3D image sensing device is provided. The 3D image sensing device includes a first camera lens, a second camera lens and a light source. The 3D image processing method includes the following steps. Firstly, a target is photographed by the first camera lens and the second camera lens, and thus a first image and a second image are obtained. Then, the first image and the second image are processed in a stereo vision mode, and thus a first depth map is obtained. Then, the light source emits plural feature points to the target, and the target is photographed by the first camera lens and the second camera lens again. Consequently, a third image and a fourth image are obtained. Then, the third image and the fourth image are processed in an active stereo vision mode, and thus a second depth map is obtained. Afterwards, the first depth map and the second depth map are selected and synthesized according to a synthetization strategy, and thus a synthesized depth map is obtained.

In accordance with another aspect of the present invention, a 3D image sensing device with a 3D image processing function is provided. The 3D image sensing device includes a first camera lens, a second camera lens, a light source and a processing unit. The first camera lens is used for photographing a target. The second camera lens is used for photographing the target. The light source is used for emitting plural feature points to the target. The processing unit is used for performing an image processing process. In a stereo vision mode, a first image and a second image are obtained after the target is photographed by the first camera lens and the second camera lens, and a first depth map is obtained after the first image and the second image are processed by the processing unit. In an active stereo vision mode, a third image and a fourth image are obtained after the light source emits plural feature points to the target and the target is photographed by the first camera lens and the second camera lens, and a second depth map is obtained after the third image and the fourth image are processed by the processing unit. After the first depth map and the second depth map are selected and synthesized by the processing unit according to a synthetization strategy, a synthesized depth map is obtained.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a 3D image sensing device with a 3D image processing function and a 3D image processing method for the 3D image sensing device. A first embodiment of the 3D image sensing device and the 3D image processing method will be described as follows.

Figure 1:
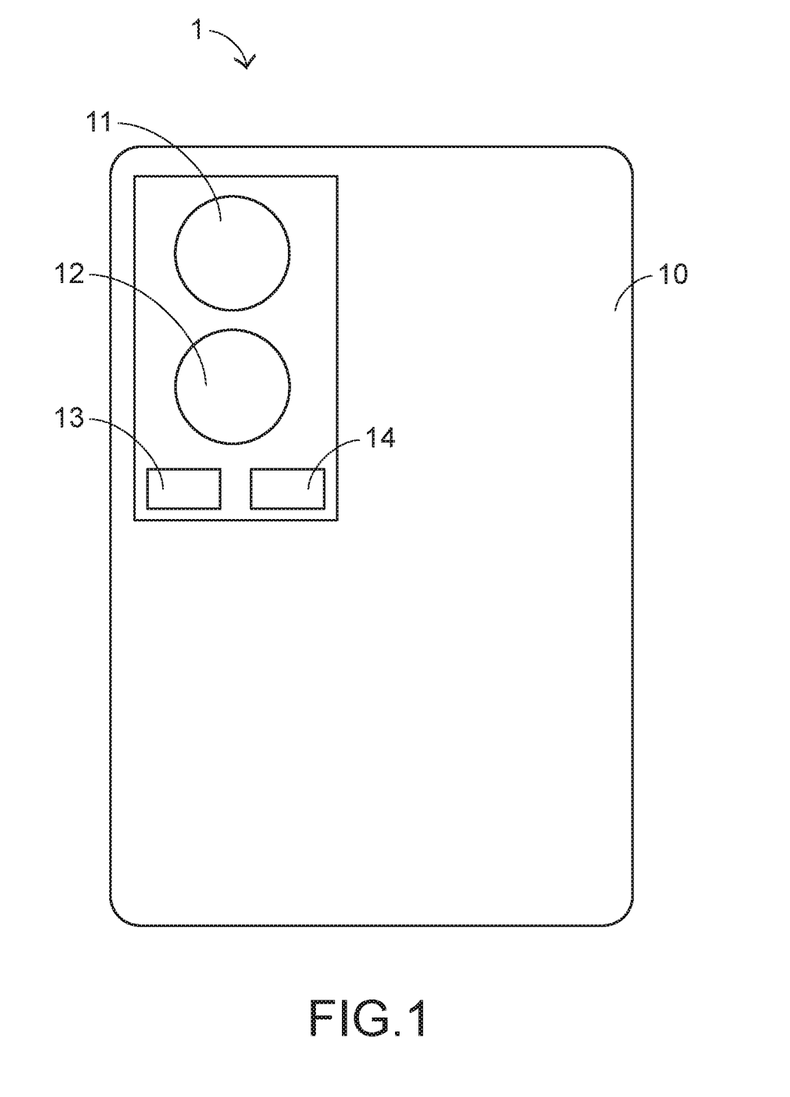
FIG. 1 is a schematic view illustrating the appearance of a 3D image sensing device according to an embodiment of the present invention.

FIG. 1 is a schematic view illustrating the appearance of a 3D image sensing device according to an embodiment of the present invention. As shown in FIG. 1, the 3D image sensing device 1 comprises a housing 10, a first camera lens 11, a second camera lens 12 and a light source 13. The first camera lens 11, the second camera lens 12 and the light source 13 are installed on the housing 10. The 3D image sensing device 1 further comprises a processing unit (not shown), associated electronic components and associated circuitry structures, which are disposed within the housing 10.

For example, the 3D image sensing device 1 is a mobile electronic device (e.g., a smart phone, a wearable device or a laptop), a smart car, a robot and or any other appropriate device that employs the 3D image sensing technology. The two camera lenses 11 and 12 are used to implement the stereo vision technology, and the two camera lenses and the light source 13 are cooperatively used to implement the active stereo vision technology.

In an embodiment, the two camera lenses (i.e., the first camera lens 11 and the second camera lens 12) are used to photograph a target (not shown). For example, the first camera lens 11 is the left lens, and the second camera lens 12 is the right lens. The light source 13 can emit plural feature points to the target. After the images photographed according to the stereo vision technology and the active stereo vision technology are processed by the processing unit, the corresponding depth maps are generated. The principles and applications of the stereo vision technology and the active stereo vision technology are well known to those skilled in the art, and not redundantly described herein.

The 3D image processing method of the present invention is executed by a firmware component that is installed in the 3D image sensing device 1. Alternatively, the 3D image processing method is written as operation program codes and stored in a flash memory of the 3D image sensing device 1. After the operation program codes are accessed and executed by the processing unit, the 3D image processing method is operated.

Figure 2:
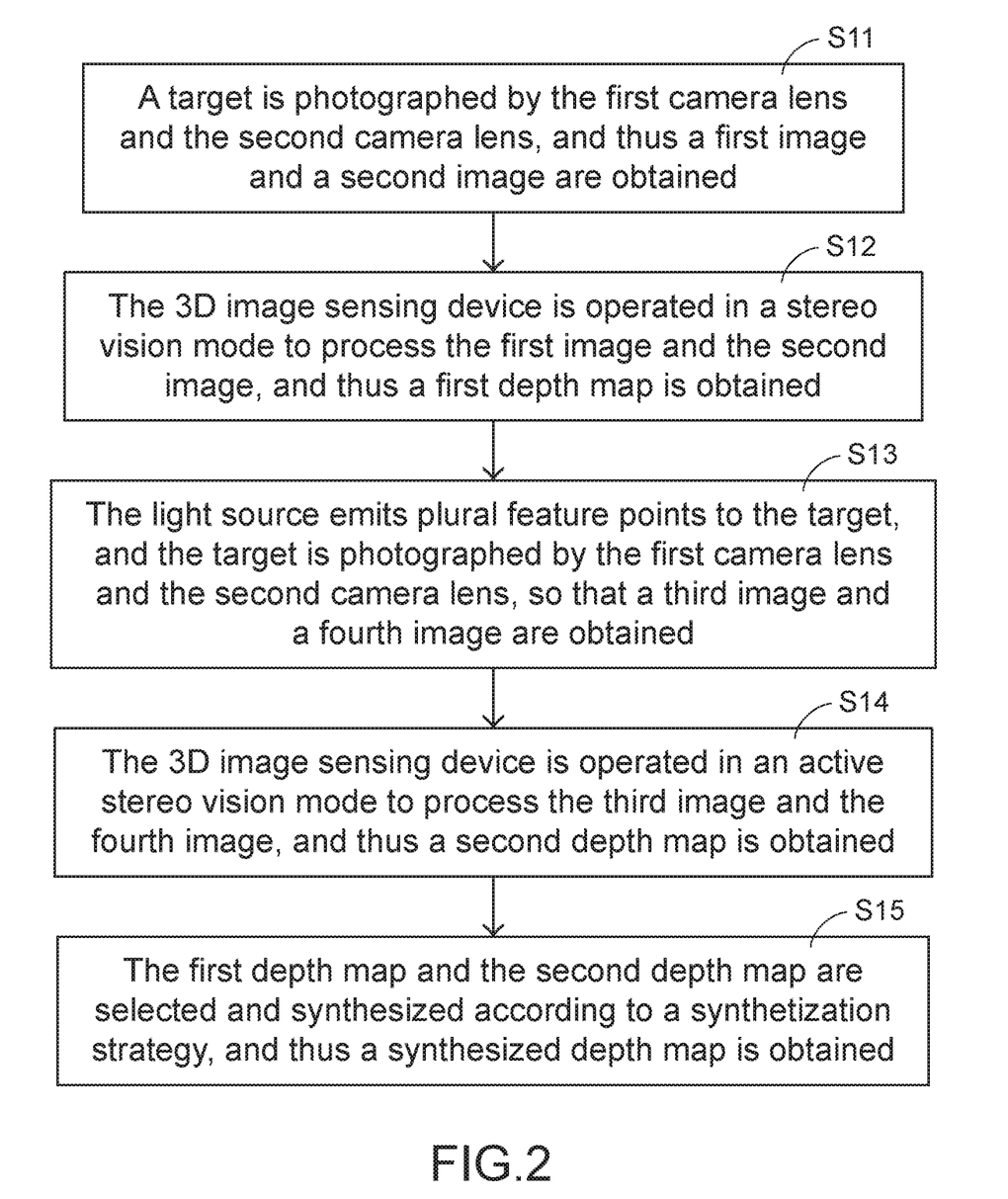
FIG. 2 illustrates a flowchart of a 3D image processing method according to a first embodiment of the present invention.
Figure 3:
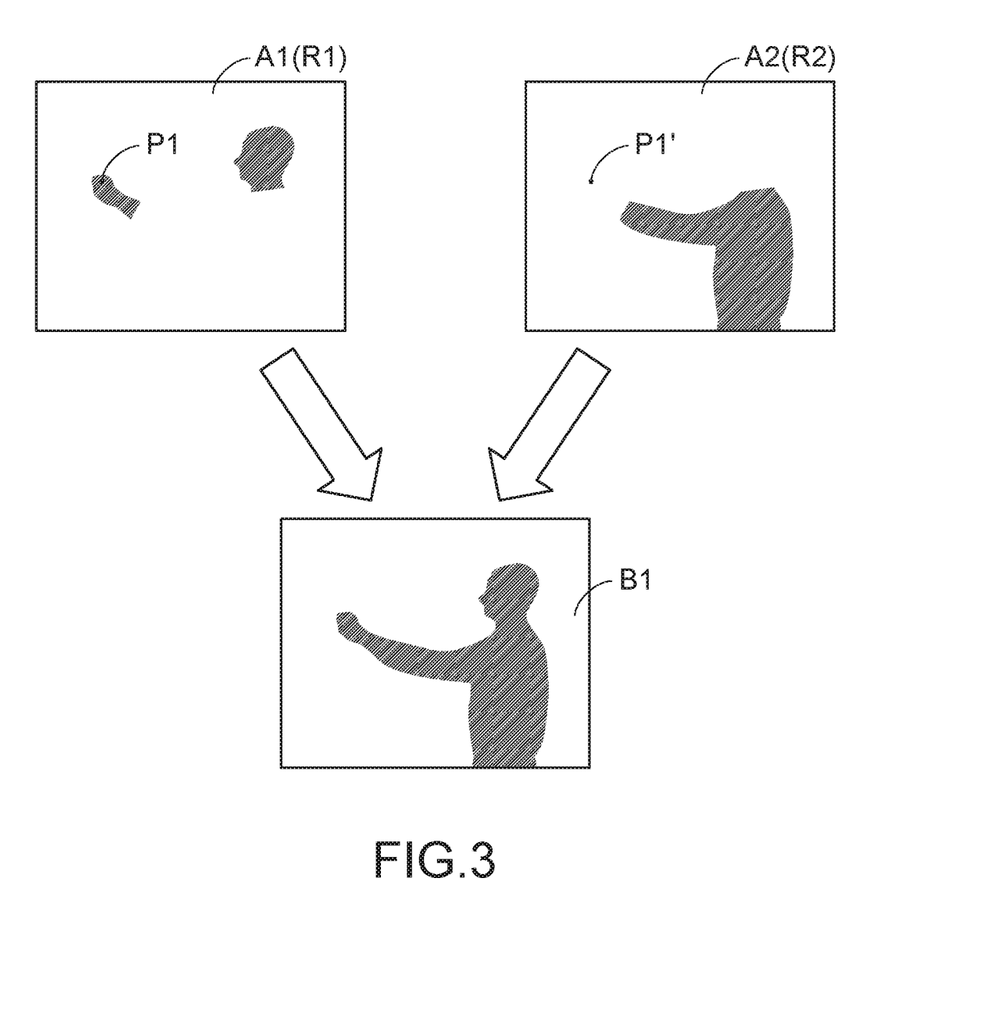
FIG. 3 schematically illustrates an implementation example of selecting and synthesizing the corresponding depth maps by using the 3D image processing method of the first embodiment.

Please refer to FIGS. 2 and 3. FIG. 2 illustrates a flowchart of a 3D image processing method according to a first embodiment of the present invention. FIG. 3 schematically illustrates an implementation example of selecting and synthesizing the corresponding depth maps by using the 3D image processing method of the first embodiment.

Please refer to FIG. 2. Firstly, in a step S11, a target is photographed by the first camera lens 11 and the second camera lens 12, so that a first image and a second image are obtained. Then, in a step S12, the 3D image sensing device 1 is operated in a stereo vision mode to process the first image and the second image, so that a first depth map A1 is obtained. Then, in a step S13, the light source 13 emits plural feature points to the target, and the target is photographed by the first camera lens 11 and the second camera lens 12, so that a third image and a fourth image are obtained. Then, in a step S14, the 3D image sensing device 1 is operated in an active stereo vision mode to process the third image and the fourth image, so that a second depth map A2 is obtained. Afterwards, in a step S15, the first depth map A1 and the second depth map A2 are selected and synthesized according to a synthetization strategy, so that a synthesized depth map B1 is obtained.

In the steps S11 and S12, the first image (not shown) is the left image, and the second image (not shown) is the right image. Moreover, in the stereo vision mode, the processing unit is operated according to the stereo vision technology, and the corresponding depth map (i.e., the first depth map A1 as shown in FIG. 3) is obtained after the associated calculation is performed on the parallax between the first image and the second image. In the first depth map A1, the depth data are presented in grayscale, and the part without depth data is displayed in white. The first depth map A1 in this embodiment is presented for simple illustration only. That is, the first depth map A1 has one type of depth, but is not limited thereto.

In the steps S13 and S14, the light source 13 is a light-emitting diode (LED), a laser diode (LD) or a vertical cavity surface emitting laser (VCSEL). The light source 13 can emit plural feature points. The plural feature points are uniformly scattered on the target in order for facilitating recognition. Similarly, the third image (not shown) is the left image, and the fourth image (not shown) is the right image.

In the active stereo vision mode, the processing unit is operated according to the active stereo vision technology, and the corresponding depth map (i.e., the second depth map A2 as shown in FIG. 3) is obtained after the associated calculation is performed on the parallax between the third image and the fourth image. The presentation method of the second depth map A2 is identical to the presentation method of the first depth map A1.

In this embodiment, the steps S11~S12 of generating the first depth map A1 according to the stereo vision technology are performed before the steps S13~S14 of generating the second depth map A2 according to the active stereo vision technology. It is noted that the sequences of the steps S11~S12 and the steps S13~S14 are not restricted. In some other embodiments, the steps of generating the corresponding depth map according to the stereo vision technology are performed after the steps of generating the corresponding depth map according to the active stereo vision technology. Likely, the purpose of the 3D image processing method of the present invention can be achieved.

In practice, the first camera lens 11 and the second camera lens 12 photograph the target by using a static method or a dynamic method. In case that the target is photographed by using the static method, the acquired images (i.e., the first, second, third and fourth images) are static image frames. In case that the target is photographed by using the dynamic method, the acquired images (i.e., the first, second, third and fourth images) are streaming image frames. That is, each image frame can be processed into the corresponding depth map in real time.

As previously described in the prior art, the stereo vision technology and the active stereo vision technology can supplement each other to a considerable extent in the identification application. For example, if the target has many features, the stereo vision technology is suitable for identification, but the active stereo vision technology is not suitable for identification. Whereas, if the target has few features, the active stereo vision technology is suitable for identification, but the stereo vision technology is not suitable for identification. For example, since the edge features of the wire target are obvious, the stereo vision technology is suitable for photographing the target directly. Moreover, since the content of the flat target is simple, it is better to use the active stereo vision technology to photograph the feature points.

In accordance with a feature of the present invention, the first depth map A1 and the second depth map A2 are obtained according to different technologies. Moreover, the final result is not determined according to one depth map only. Since the final result is determined according to the combination of the first depth map A1 and the second depth map A2, the information in the first depth map A1 and the information in the second depth map A2 can be effectively utilized.

In the step S15, the first depth map A1 and the second depth map A2 are selected and synthesized according to the synthetization strategy. Particularly, the target is photographed by the two camera lenses 11 and 12 at the same viewing angle when the 3D image sensing device 1 is operated in the stereo vision mode and the active stereo vision mode. Consequently, the first depth map A1 has a first range R1, and the second depth map A2 has a second range R2. The first range R1 and the second range R2 are related to the same spatial range. In other words, the first depth map A1 and the second depth map A2 have the same dimension. Any coordinate (or any point) in the first depth map A1 and the corresponding coordinate in the second depth map A2 are related to the identical actual photographed point. For example, as shown in FIG. 3, a specified location P1 in the first depth map A1 and a specified location P1' in the second depth map A2 have the same coordinate. In other words, the locations P1 and P1' are related to the same actual photographed point.

As mentioned above, the synthetization strategy of the present invention is specially defined. In accordance with the synthetization strategy, the depth data corresponding to each of the same locations of the two depth maps A1 and A2 are checked, and then the qualified depth data are selected from the first depth map A1 and/or the second depth map A2. Consequently, the selected depth data of the first depth map A1 and the selected depth data of the second depth map A2 are synthesized as the synthesized depth map B1 (see FIG. 3). For example, the procedure of checking the depth data of the specified location P1 and the depth data of the specified location P1' by the processing unit is repeatedly done. After the depth data of all locations of the first depth map A1 and the depth data of the corresponding locations of the second depth map A2 are checked, the selected depth data of the first depth map A1 and the selected depth data of the second depth map A2 are synthesized as the synthesized depth map B1 by the processing unit.

In this embodiment, if the corresponding location of the first depth map A1 or the second depth map A2 contains the depth data, it means that the information about the distance between the 3D image sensing device 1 and the target is obtained. Whereas, if the corresponding location of the first depth map A1 or the second depth map A2 does not contain the depth data, it means that the depth map has a vacant site. That is, the information about the distance between the 3D image sensing device 1 and the target cannot be obtained.

In other words, the synthetization strategy in the step S15 includes the following situations.

In a first situation, a specified location of the first depth map A1 has a depth data, but the corresponding location of the second depth map A2 has no depth data. In this situation, the corresponding depth data of the first depth map A1 is selected.

In a second situation, a specified location of the first depth map A1 has no depth data, but the corresponding location of the second depth map A2 has a depth data. In this situation, the corresponding depth data of the second depth map A2 is selected.

As mentioned above, one of the first depth map A1 and the second depth map A2 is selected in the first situation or the second situation of the synthetization strategy. That is, if a specified point has the depth data in one of the first depth map A1 and the second depth map A2 but the specified point has no depth data in the other of the first depth map A1 and the second depth map A2, the depth map with the depth data is selected. There are two possible scenarios in the first situation or the second situation. In the first scenario, the depth data corresponding to the edges, the contours, the patterns or other sites with obvious features can be obtained according to the stereo vision technology, but the depth map of obtained according to the active stereo vision technology has vacant sites. In the second scenario, the depth data corresponding to the flat surfaces, the curved surfaces or other sites without obvious features can be obtained according to the active stereo vision technology, but the depth map of obtained according to the stereo vision technology has vacant sites.

In a third situation, a specified location of the first depth map A1 has a depth data, and the corresponding location of the second depth map A2 has a depth data. In this situation, the corresponding depth data of the first depth map A1 and the corresponding depth data of the second depth map A2 are subjected to an average calculating operation. According to this selecting method, if one point contains depth data in both of the first depth map A1 and the second depth map A2, the two depth maps A1 and A2 are both selected. In case that the features are neither very obvious nor very non-obvious, the depth can be obtained according to both of the stereo vision technology and the active stereo vision technology.

As mentioned above, in the third situation, the depth can be obtained according to both of the stereo vision technology and the active stereo vision technology. Since the distance of the target obtained according to the stereo vision technology and the distance of the target obtained according to the active stereo vision technology are not much different, the use of the average calculating operation to process the depth data is feasible. In an embodiment, the average calculating operation is an arithmetic average calculating operation. That is, the final result of the arithmetic average calculating operation is the summed average of the depth data obtained according to the stereo vision technology and the depth data obtained according to the active stereo vision technology (i.e., directly added and then divided by 2).

The average calculating operation is not restricted to the arithmetic average calculating operation. For example, in some other embodiments, the average calculating operation is a geometric average calculating operation or a weighted average calculating operation. The final result of the geometric average calculating operation is the multiplicated average of the depth data obtained according to the stereo vision technology and the depth data obtained according to the active stereo vision technology (i.e., directly multiplied and then the square root is found). The final result of the weighted average calculating operation is determined according to weights and the final result of the arithmetic average calculating operation. The weights is determined according to the practical requirements. Consequently, the final result of the weighted average calculating operation is close to the depth data of one depth map.

In a fourth situation, a specified location of the first depth map A1 has no depth data, and the corresponding location of the second depth map A2 has no depth data. In this situation, the selecting action is not done. That is, if a specified point has no depth data in both of the first depth map A1 and the second depth map A2, the selecting action is not performed on the depth maps A1 and A2. This situation may be related to the sensitivity of the device or the photographing effect of the actual scene, and the depth data cannot be obtained according to these two technologies. In the 3D imaging sensing applications, there are still some situations that cannot be overcome by the stereo vision technology or the active stereo vision technology.

As mentioned above, in the fourth situation, the selecting action and the image processing action are not performed. Consequently, the corresponding location of the synthesized depth map B1 has a vacant site. It is noted that this situation is seldomly generated. In practice, the stereo vision technology and the active stereo vision technology can effectively supplement each other in the identification application.

As mentioned above, the synthetization strategy in the step S15 includes four situations. After the depth data of all locations of the first depth map A1 and the depth data of the corresponding locations of the second depth map A2 are checked, selected or further calculated according to the synthetization strategy, the synthesized depth map B1 is obtained. In other words, the synthesized depth map B1 contains the depth data that can best reflect the actual distance. That is, the depth data of the two depth maps A1 and A2 can be effectively used.

In the above embodiment, the target is photographed under a general ambient light source. It is noted that numerous modifications and alterations may be made while retaining the teachings of the invention. For example, in another embodiment, the 3D image sensing device 1 further comprises an illumination unit 14 for providing supplementary light. As shown in FIG. 1, the light source 13 and the illumination unit 14 are installed on the housing 10. If the intensity of the light beam from the ambient light source where the target is located is weak or the distance from the target is relatively long, the illumination unit 14 is enabled. After the illumination unit 14 is enabled to provide supplementary light, the target is photographed by the first camera lens 11 and the second camera lens 12.

Figure 4A:
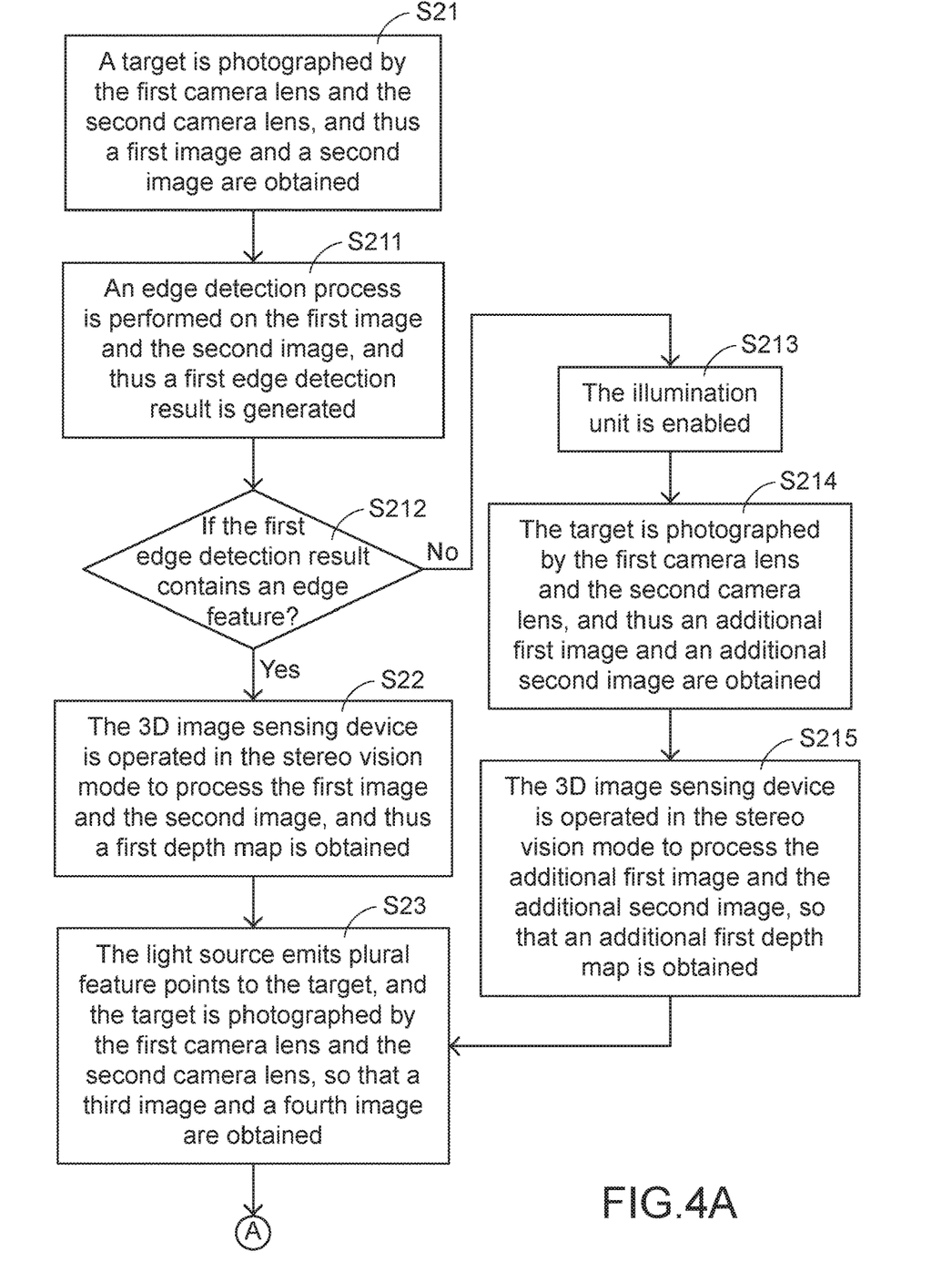
FIGS. 4A and 4B illustrate a flowchart of a 3D image processing method according to a second embodiment of the present invention.
Figure 4B:
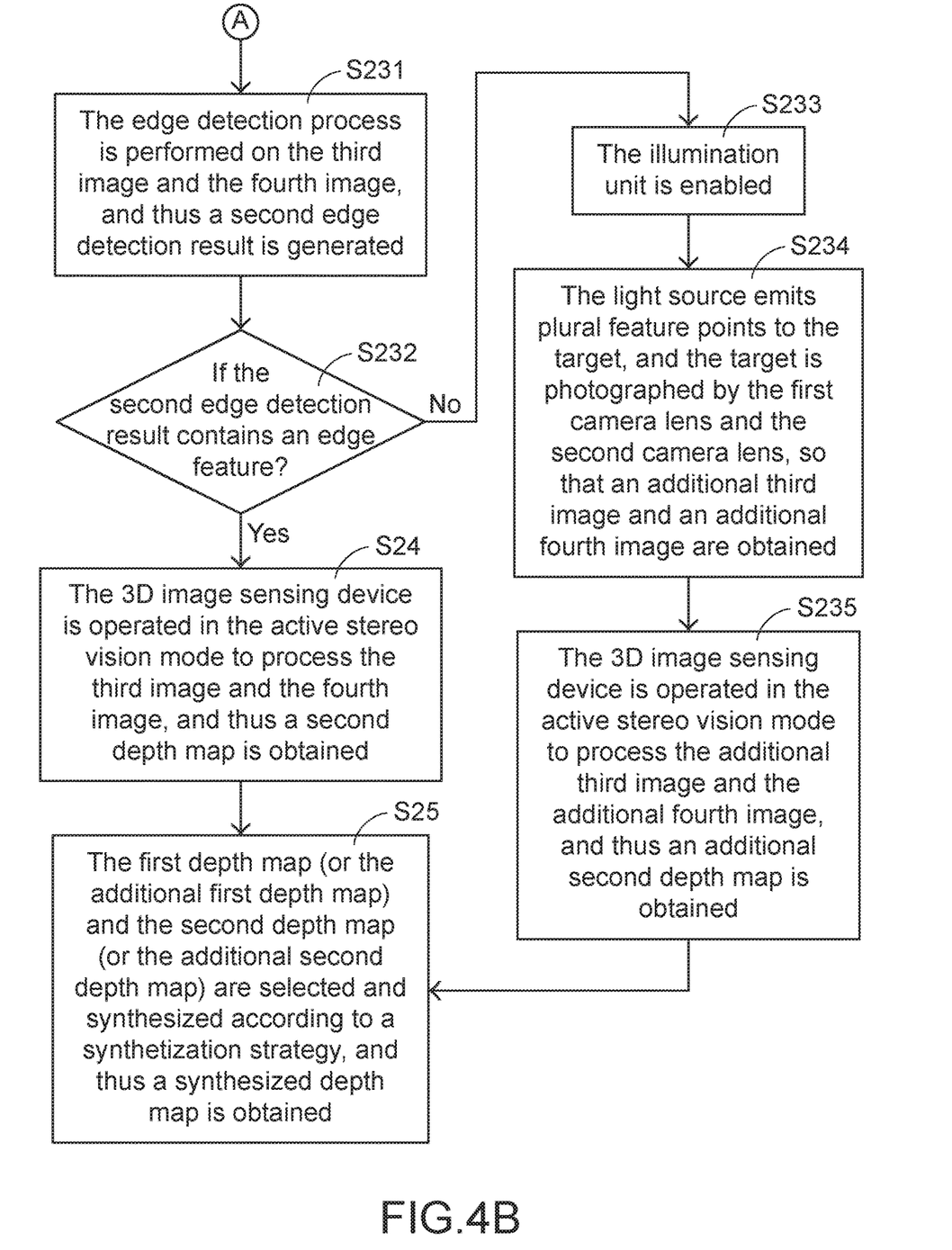

A second embodiment of a 3D image sensing device with a 3D image processing function and a 3D image processing method for the 3D image sensing device will be described as follows. FIGS. 4A and 4B illustrate a flowchart of a 3D image processing method according to a second embodiment of the present invention.

Please refer to FIGS. 4A and 4B. Firstly, in a step S21, a target is photographed by the first camera lens 11 and the second camera lens 12, so that a first image and a second image are obtained. Then, in a step S211, an edge detection process is performed on the first image and the second image, so that a first edge detection result is generated. Then, a step S212 is performed to judge whether the first edge detection result contains an edge feature. If the judging result of the step S212 indicates that the first edge detection result contains any edge feature, the 3D image sensing device 1 is operated in a stereo vision mode to process the first image and the second image, so that a first depth map is obtained (Step S22). Whereas, if the judging result of the step S212 indicates that the first edge detection result contains no edge feature, the illumination unit 14 is enabled (Step S213). After the illumination unit 14 is enabled to provide supplementary light, the target is photographed by the first camera lens 11 and the second camera lens 12, so that an additional first image and an additional second image are obtained (Step S214). Then, in a step S215, the 3D image sensing device 1 is operated in the stereo vision mode to process the additional first image and the additional second image, so that an additional first depth map is obtained.

After the step S22 or the step S215 is completed, the light source 13 emits plural feature points to the target, and the target is photographed by the first camera lens 11 and the second camera lens 12, so that a third image and a fourth image are obtained (Step S23). Then, in a step S231, the edge detection process is performed on the third image and the fourth image, so that a second edge detection result is generated. Then, a step S232 is performed to judge whether the second edge detection result contains an edge feature. If the judging result of the step S232 indicates that the second edge detection result contains any edge feature, the 3D image sensing device 1 is operated in an active stereo vision mode to process the third image and the fourth image, so that a second depth map is obtained (Step S24).

Whereas, if the judging result of the step S232 indicates that the second edge detection result contains no edge feature, the illumination unit 14 is enabled (Step S233). After the illumination unit 14 is enabled to provide supplementary light and the light source 13 emits plural feature points to the target, the target is photographed by the first camera lens 11 and the second camera lens 12, so that an additional third image and an additional fourth image are obtained (Step S234). Then, in a step S235, the 3D image sensing device 1 is operated in the active stereo vision mode to process the additional third image and the additional fourth image, so that an additional second depth map is obtained. After the step S24 or the step S235 is completed, the first depth map (or the additional first depth map) and the second depth map (or the additional second depth map) are selected and synthesized according to a synthetization strategy, so that a synthesized depth map is obtained (Step S25).

The steps S21, S22, S23 and S24 in the flowchart of FIGS. 4A and 4B are respectively identical to the steps S11, S12, S13 and S14 in the flowchart of FIG. 2. In comparison with the first embodiment, the steps S211~S215 and the steps S231~S235 in the 3D image processing method of this embodiment are distinguished. In this embodiment, the left image and the right image obtained in the stereo vision mode and the active stereo vision mode are subjected to the edge detection process by the processing unit, and then the processing unit judges whether the edge detection result contains an edge feature. If the edge detection result contains any edge feature, the flowchart of FIG. 2 is performed. If the edge detection result contains no edge feature, the steps S213~S215 or the steps S233~S235 are performed.

In this embodiment, the edge detection process is an edge extraction process such as a Sobel edge detection process or a Laplacian edge detection process.

If the intensity of the light beam from the ambient light source where the target is located is weak or the distance from the target is relatively long, the edge part or the pattern of the object shown in the image is not obvious, the edge detection process is performed or a high-frequency filtering process is performed. In the edge detection process, a gradient change of a mask window exceeding a threshold value indicates that there is at least one edge feature. If a low-frequency signal is removed and a high-frequency signal with edge information is retained after the high-frequency filtering process is performed, it means that there is at least one edge feature. If no edge feature is contained in the image, the 3D image sensing device in each of the stereo vision technology and the active stereo vision technology is unable to generate the depth map. For solving the above problems, the illumination unit 14 is enabled to provide supplementary light. Then, the target is photographed again, and the left image and the right image are obtained. Consequently, a better depth map can be obtained according to the left image and the right image.

The step S25 is similar to the step S15 of FIG. 2. That is, the depth map obtained in the step S22 or the step S215 and the depth map obtained in the step S24 or the step S235 are selected and synthesized. Consequently, regardless of whether the supplementary light is provided or not provided, the synthesized depth map can be generated. Generally, the provision of the supplementary light can overcome environmental factors to increase the sharpness of the captured image. That is, the depth sensing efficacy is enhanced, but the depth calculation is not affected.

In this embodiment, the illumination unit 14 is disabled after the step S215 is completed. In other words, the third image and the fourth image are obtained when no supplementary light is provided. Under the condition that no supplementary light is provided, the processing unit judges whether the third image and the fourth image contain the edge features.

In practice, the illumination unit 14 is selectively in the enabled state (i.e., the supplementary light is provided) or the disabled state (i.e., the supplementary light is not provided). That is, in the flowchart of FIG. 4A, either the step S22 or the steps S213~S215 will be performed. Similarly, in the flowchart of FIG. 4B, either the step S24 or the steps S233~S235 will be performed. Consequently, the synthesized depth map is selected and synthesized in one of four possible combined conditions.

As mentioned above, the 3D image sensing device 1 can be operated in one of four possible combined conditions. In the first combined condition, the supplementary light is needed in the stereo vision mode, but the supplementary light is not needed in the active stereo vision mode. In the second combined condition, the supplementary light is needed in the active stereo vision mode, but the supplementary light is not needed in the stereo vision mode. In the third combined condition, the supplementary light is needed in the stereo vision mode, and the supplementary light is needed in the active stereo vision mode. In the fourth combined condition, the supplementary light is not needed in the stereo vision mode, and the supplementary light is not needed in the active stereo vision mode. In other words, the depth maps to be selected and synthesized in the step S25 are determined according to the corresponding combined condition. For example, if the first depth map and the second depth map are selected and synthesized, it means that the flowchart of FIG. 2 is carried out. On the other hand, if the supplementary light is provided, the first depth map and the additional second depth map are selected and synthesized, or the additional first depth map and the second depth map are selected and synthesized, or the additional first depth map and the additional second depth map are selected and synthesized.

It is noted that numerous modifications and alterations may be made while retaining the teachings of the invention. For example, in another embodiment, the illumination unit 14 is enabled to provide supplementary light in both of the stereo vision mode and the active stereo vision mode. Consequently, the steps S231~S233 may be omitted. In case that the illumination unit 14 is maintained in the enabled state, the step S234 is performed immediately after the step S215 is completed.

Consequently, the additional first depth map and the additional second depth map are selected and synthesized.

From the above descriptions, the present invention provides a 3D image sensing device with a 3D image processing function and a 3D image processing method for the 3D image sensing device. When compared with the conventional technologies, the 3D image sensing device and the 3D image processing method can well utilize the stereo vision technology and the active stereo vision technology. Consequently, the vacant sites in the synthesized depth map are largely reduced. Moreover, since the depth data that best reflects the actual distance is obtained, the identification result is more accurate.

In other words, the 3D image sensing device and the 3D image processing method of the present invention are capable of effectively overcoming the drawbacks of the conventional technologies and achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A 3D image processing method for a 3D image sensing device, the 3D image sensing device comprising a first camera lens, a second camera lens, a light source, and an illumination unit, the 3D image processing method comprising steps of:
    allowing the first camera lens and the second camera lens to photograph a target, so that a first image and a second image are obtained;
    processing the first image and the second image in a stereo vision mode, so that a first depth map is obtained;
    allowing the light source to emit plural feature points to the target, and allowing the first camera lens and the second camera lens to photograph the target again, so that a third image and a fourth image are obtained;
    processing the third image and the fourth image in an active stereo vision mode, so that a second depth map is obtained;
    selecting and synthesizing the first depth map and the second depth map according to a synthetization strategy to obtain a synthesized depth map;
    performing an edge detection process on the first image and the second image to generate a first edge detection result;
    enabling the illumination unit if the first edge detection result contains no edge feature;
    when the illumination unit is enabled to provide supplementary light, allowing the first camera lens and the second camera lens to photograph the target to obtain an additional first image and an additional second image, and processing the additional first image and the additional second image in the stereo vision mode to obtain an additional first depth map;
    performing the edge detection process on the third image and the fourth image to generate a second edge detection result;
    enabling the illumination unit if the second edge detection result contains no edge feature;
    when the illumination unit is enabled to provide supplementary light, allowing the light source to emit plural feature points to the target, and allowing the first camera lens and the second camera lens to photograph the target again to obtain an additional third image and an additional fourth image, and processing the additional third image and the additional fourth image in the active stereo vision mode to obtain an additional second depth map; and
    selecting and synthesizing the first depth map or the additional first depth map and the second depth map or the additional second depth map according to the synthetization strategy to obtain the synthesized depth map.

2. The 3D image processing method according to claim 1, wherein the first depth map has a first range, the second depth map has a second range, and the first range and the second range are related to a same spatial range, wherein according to the synthetization strategy, depth data corresponding to each of plural same locations of the first depth map and the second depth map are checked, and qualified depth data from the first depth map and/or the second depth map are selected and synthesized as the synthesized depth map.

3. The 3D image processing method according to claim 2, wherein if a specified location of the first depth map has a first depth data but a corresponding location of the second depth map has no depth data, the first depth data of the first depth map is selected, wherein if a specified location of the first depth map has no depth data but a corresponding location of the second depth map has a second depth data, the second depth data of the second depth map is selected.

4. The 3D image processing method according to claim 2, wherein if a specified location of the first depth map has a first depth data and a corresponding location of the second depth map has a second depth data, the first depth data of the first depth map and the second depth data of the second depth map are selected and subjected to an average calculating operation.

5. The 3D image processing method according to claim 4, wherein the average calculating operation is an arithmetic average calculating operation, a geometric average calculating operation or a weighted average calculating operation.

6. The 3D image processing method according to claim 2, wherein if a specified location of the first depth map has no depth data and a corresponding location of the second depth map has no depth data, both of the first depth map and the second depth map are not selected.

7. A 3D image sensing device with a 3D image processing function, the 3D image sensing device comprising:
    a first camera lens photographing a target;
    a second camera lens photographing the target;
    a light source emitting plural feature points to the target;
    an illumination unit; and
    a processing unit performing an image processing process,
    wherein in a stereo vision mode, a first image and a second image are obtained after the target is photographed by the first camera lens and the second camera lens, and a first depth map is obtained after the first image and the second image are processed by the processing unit,
    wherein in an active stereo vision mode, a third image and a fourth image are obtained after the light source emits plural feature points to the target and the target is photographed by the first camera lens and the second camera lens, and a second depth map is obtained after the third image and the fourth image are processed by the processing unit,
    wherein after the first depth map and the second depth map are selected and synthesized by the processing unit according to a synthetization strategy, a synthesized depth map is obtained;
    wherein when the illumination unit is enabled and the target is photographed by the first camera lens and the second camera lens, the illumination unit provides supplementary light;
    wherein in the stereo vision mode, a first edge detection result is generated after an edge detection process is performed on the first image and the second image by the processing unit, if the first edge detection result contains no edge feature, the illumination unit is enabled and the target is photographed by the first camera lens and the second camera lens to obtain an additional first image and an additional second image, and after the additional first image and the additional second image is processed by the processing unit, an additional first depth map is obtained;
    wherein in the active stereo vision mode, a second edge detection result is generated after the edge detection process is performed on the third image and the fourth image by the processing unit, if the second edge detection result contains no edge feature, the illumination unit is enabled and the light source emits plural feature points to the target for the first camera lens and the second camera lens to photograph the target for obtaining an additional third image and an additional fourth image, and the processing unit processes the additional third image and the additional fourth image to obtain an additional second depth map; and wherein after the first depth map or the additional first depth map and the second depth map or the additional second depth map are selected and synthesized by the processing unit according to the synthetization strategy, the synthesized depth map is obtained.

8. The 3D image sensing device according to claim 7, wherein the first depth map has a first range, the second depth map has a second range, and the first range and the second range are related to a same spatial range, wherein according to the synthetization strategy, depth data corresponding to each of plural same locations of the first depth map and the second depth map are checked, and qualified depth data from the first depth map and/or the second depth map are selected and synthesized as the synthesized depth map.

9. The 3D image sensing device according to claim 8, wherein if a specified location of the first depth map has a first depth data but a corresponding location of the second depth map has no depth data, the first depth data of the first depth map is selected by the processing unit, wherein if a specified location of the first depth map has no depth data but a corresponding location of the second depth map has a second depth data, the second depth data of the second depth map is selected by the processing unit.

10. The 3D image sensing device according to claim 8, wherein if a specified location of the first depth map has a first depth data and a corresponding location of the second depth map has a second depth data, the first depth data of the first depth map and the second depth data of the second depth map are selected and subjected to an average calculating operation by the processing unit.

11. The 3D image sensing device according to claim 10, wherein the average calculating operation is an arithmetic average calculating operation, a geometric average calculating operation or a weighted average calculating operation.

12. The 3D image sensing device according to claim 8, wherein if a specified location of the first depth map has no depth data and a corresponding location of the second depth map has no depth data, both of the first depth map and the second depth map are not selected by the processing unit.

* * * * *